United States Patent
Jean-Denis et al.

(10) Patent No.: US 7,539,892 B2
(45) Date of Patent: May 26, 2009

(54) ENHANCED RESYNCHRONIZATION IN A STORAGE-BASED MIRRORING SYSTEM HAVING DIFFERENT STORAGE GEOMETRIES

(75) Inventors: Pierre-Fortin Jean-Denis, Tucson, AZ (US); Gail A Spear, Tucson, AZ (US); Robert F Bartfai, Tucson, AZ (US); Warren K Stanley, Loveland, CO (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 11/251,339

(22) Filed: Oct. 14, 2005

(65) Prior Publication Data

US 2007/0088924 A1 Apr. 19, 2007

(51) Int. Cl.
*G06F 11/00* (2006.01)
(52) U.S. Cl. .......................................... 714/6
(58) Field of Classification Search ....... 714/6
See application file for complete search history.

(56) References Cited

U.S. PATENT DOCUMENTS

2005/0071585 A1* 3/2005 Hayardeny et al. ........... 711/162
2005/0096919 A1* 5/2005 Liu et al. ..................... 704/503

* cited by examiner

*Primary Examiner*—Scott T Baderman
*Assistant Examiner*—Jigar Patel
(74) *Attorney, Agent, or Firm*—Dan Shifrin (57) ABSTRACT

Resynchronization of data between a primary (production) data site and a secondary (recovery) site following a failure is enhanced when the size of a data track at the production site is different from the size of a data track at the recovery site. The recovery site reads an out-of-sync (OOS) bitmap created at the production site and expands or contracts the bitmap to accommodate the size difference. The resulting production site bitmap is merged with a OOS bitmap maintained at the recovery site to indicate those tracks which are to be transferred from the recovery site to the production site. Thus, only those tracks which are required to be transferred are transferred. Buffer space may be allocated in which to expand or contract the production site OOS bitmap. Buffer space may be conserved by sequentially reading portions of the production site OOS bitmap into a small buffer. In a first operation, half of the bitmap portion is discarded and the remaining half is expanded into the buffer and merged with a corresponding section of the recovery site OOS bitmap. In a second operation, the portion is re-read into the buffer and the other half discarded. The remaining half is then expanded into the buffer and merged with the corresponding section of the recovery site OOS bitmap. The process continues until the entire production site OOS bitmap has been merged with the recovery site OOS bitmap.

12 Claims, 4 Drawing Sheets

ENHANCED RESYNCHRONIZATION IN A STORAGE-BASED MIRRORING SYSTEM HAVING DIFFERENT STORAGE GEOMETRIES

TECHNICAL FIELD

The present invention is related generally to mirrored storage systems such as peer-to-peer remote copy systems and, in particular, to resynchronizing data between a production site and a recovery site following a system failure.

BACKGROUND ART

A mirrored storage system, such as a peer-to-peer remote copy system, typically will include a primary or production site attached to a host and a secondary or recovery site which may or may not be geographically remote from the production site. During normal operation of the system, the data at the recovery site remains synchronized with data at the production site in order to maintain a consistent backup set of data at the recovery site. A failure at the production site severs the communications link between the production and recovery sites and triggers a "failover" operation at the recovery site. During the failover operation, host writes are directed to the recovery site which keeps track of all such writes in an "out-of-sync (OOS) bitmap. In the bitmap, each bit which is set represents a data track which has been modified and will need to be transferred to the production site after recovery from the failure.

During the failure and subsequent recovery, host writes may also be performed at the production site. These writes may include test writes made during recovery or mid-transaction writes which were interrupted at the time of the failover. Data associated with such writes at the production site are considered corrupt and should be discarded as part of the recovery process. Consequently, these tracks should be replaced by the corresponding valid tracks stored at the recovery site.

Recovery from a failure includes a failback resynchronization operation whereby correct tracks (to replace corrupt production site tracks) and modified tracks are transferred from the recovery site to the production site. During conventional resynchronizations, the recovery site reads the OOS bitmap of the production site and merges it with the OOS bitmap of the recovery site, such as with a logical OR operation. The resulting bitmap indicates all of the tracks which are to be transferred to the production site to resynchronize production site data.

In many mirrored systems, however, disk geometries at the two sites are different; that is, the size of data tracks at the production site are different from the size of data tracks at the recovery site. For example, if the production site includes an IBM® TotalStorage® DS8000 or DS6000 disk storage system, the track size will be 64K. If the recovery site includes an IBM TotalStorage Enterprise Storage Server® Model 800, the track size will be 32K. It will be appreciated that the OOS bitmaps of the two sites will not be compatible with each other and cannot, therefore, be directly merged. One solution to this problem has been for the recovery site to determine the track numbers of the first and last tracks indicated by the production site OOS bitmap and adjust those track numbers to match the corresponding track numbers at the recovery site. For example, the OOS bitmap may indicate that tracks 1 and 1,000,000 have been modified. All of the tracks between the adjusted first and last tracks are then transferred from the recovery site to the production site, even if only a few of the tracks needed to be transferred. Thus, in the example all one million tracks will be transferred, even though only two needed to be. Consequently, it will be appreciated that this solution can impose a large performance penalty on the failback resynchronization process.

SUMMARY OF THE INVENTION

The present invention provides enhanced resynchronization of data between a primary (production) data site and a secondary (recovery) site following a failure when the size of a data track at the production site is different from the size of a data track at the recovery site. The recovery site reads an out-of-sync (OOS) bitmap created at the production site and expands or contracts the bitmap to accommodate the size difference. The resulting production site bitmap is merged with a OOS bitmap maintained at the recovery site. Thus, only those tracks which are required to be transferred from the recovery site to the production site are transferred.

Buffer space may be allocated in which to expand or contract the production site OOS bitmap. Preferably, buffer space is conserved by sequentially reading portions of the production site OOS bitmap into a small buffer, equal in size, for example, to the size of a block or packet which can be transmitted from the production site to the recovery site. In a first operation, half of the bitmap portion is discarded and the remaining half is expanded into the buffer and merged with a corresponding section of the recovery site OOS bitmap. In a second operation, the portion is re-read into the buffer and the other half discarded. The remaining half is then expanded into the buffer and merged with the corresponding section of the recovery site OOS bitmap. The process continues until the entire production site OOS bitmap has been merged with the recovery site OOS bitmap at which time the indicated tracks are transferred to the production site to complete the recovery operation.

DETAILED DESCRIPTION OF THE PREFERRED EMBODIMENT

Figure 1:
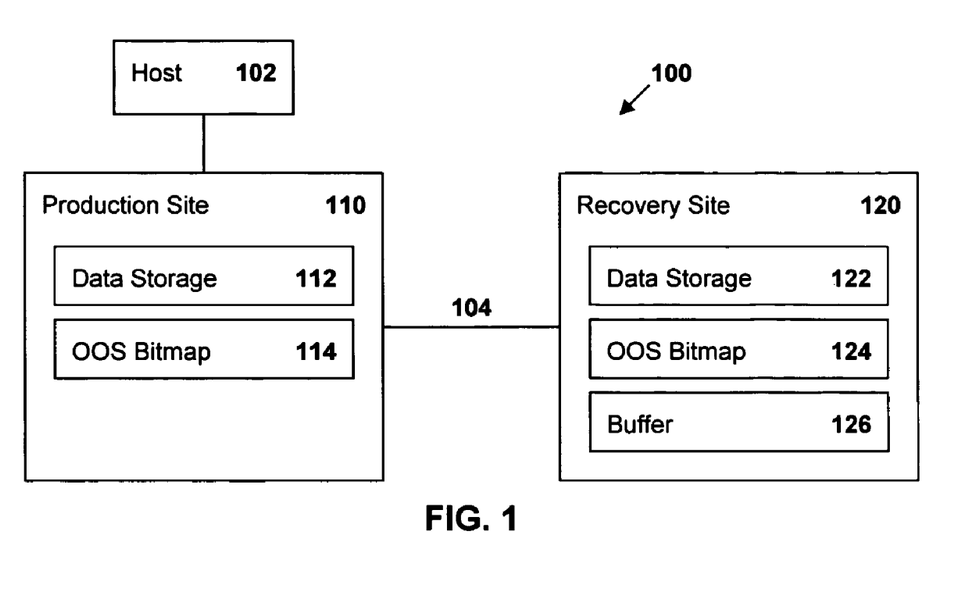
FIG. 1 is a block diagram of a mirrored storage system in which the present invention may be implemented.

FIG. 1 is a block diagram of a mirrored storage system 100 in which the present invention may be implemented. The system includes a primary or production site 110 attached to one or most host devices 102 and to a secondary or recovery site 120 at which copies of data volumes from the production site 110 are synchronized and stored. The production and recovery sites each include data storage 112, 122 and an out-of-sync (OOS) bitmap 114, 124. In addition, the recovery site 110 further includes a buffer 126.

As noted above, when a failure occurs, such as at the production site 110, the communications link 104 between the two sites 110 and 120 is severed, triggering a failover operation at the recovery site 120. Host writes are directed to the recovery site 120 which keeps track of all such writes in the recovery site OOS bitmap 124. In the bitmap 124, each bit which is set represents a data track which has been modified and will need to be transferred to the production site 110 after recovery from the failure. In addition, there may be some host writes to tracks at the production site 110 which are identified in the production site OOS bitmap 114. These tracks are to be discarded from the production site storage 112 during recovery and replaced with corresponding valid tracks from the recovery site 120.

Figure 2A:
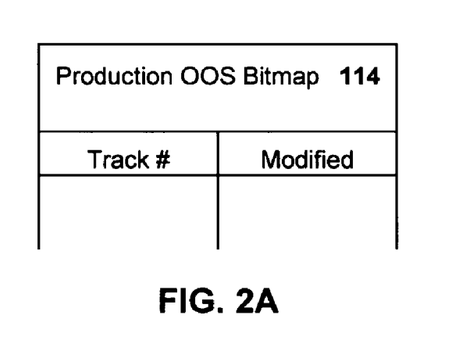
FIGS. 2A and 2B illustrate representative original and expanded production site OOS bitmaps, respectively.
Figure 2B:
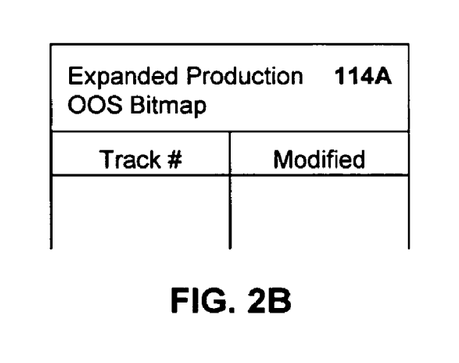
Figure 3:
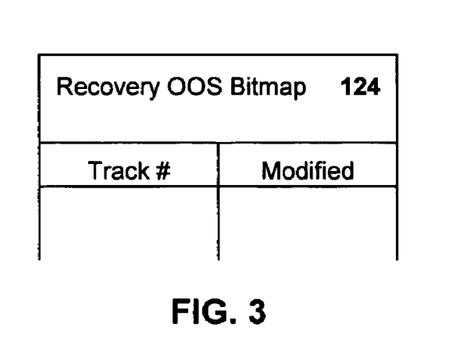
FIG. 3 illustrates a representative recovery site OOS bitmap.
Figure 4:
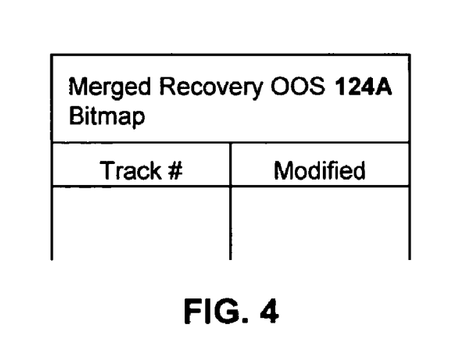
FIG. 4 illustrates the recovery site OOS bitmap following a merger with the expanded production site OOS bitmap.

FIG. 2A represents the production site OOS bitmap 114 and FIG. 3 represents the recovery site OOS bitmap 124 prior to recovery. During recovery operations, the production site OOS bitmap 114 is expanded (or contracted, if the track size at the recovery site 110 is greater than the track size at the production site 120), as illustrated in FIG. 2B. If, for example, the track size at the production site 110 is 64K and that at the recovery site 120 is 32K, each production site track will be divided into two tracks, each of which corresponds to one recovery site track. The resulting production site OOS bitmap 114A is then read by the recovery site 120 to be merged into the recovery site OOS bitmap 124 to generate a merged recovery site OOS bitmap 124A (FIG. 4). The merge may be performed as a logical OR operation. Although the expansion/contraction and merge preferably occurs at the recovery site, it may occur at the production site instead.

Figure 5:
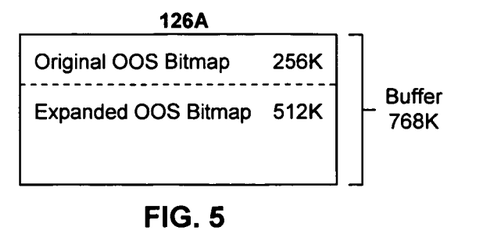
FIG. 5 represents a production site buffer of one embodiment of the present invention in which the full OOS bitmap is expanded into additional, empty buffer space.

Referring now to FIG. 5, in one embodiment, the entire original production site OOS bitmap 114 is transferred to the recovery site 120, stored in a large buffer 126A. If a volume stored at production site contains 128K cylinders of 15 tracks each, the production site OOS bitmap 114 requires 256K: each cylinder requires two bytes in the map and each bit represent one track (the 16$^{th}$ bit being unused). If the production site tracks are twice the size of recovery site tracks, the expanded production site OOS bitmap, which will be merged with the recovery site OOS bitmap, will require 512K. Thus, 768K is allocated for the buffer 126A in this embodiment.

Figure 6A:
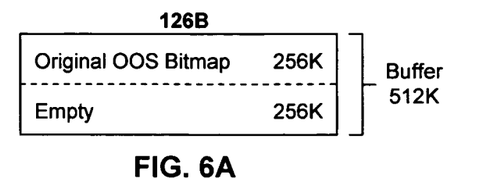
FIGS. 6A and 6B represent a production site buffer of another embodiment of the present invention in which the full OOS bitmap is expanded into a smaller buffer space.
Figure 6B:
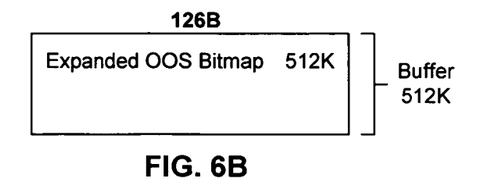

Buffer space may be saved as provided in another embodiment of the present invention, illustrated in FIGS. 6A and 6B. Rather than expand the OOS bitmap 114 into previously empty buffer space, the OOS bitmap 114 may be read into half of allocated buffer space and then expanded into the full buffer space (FIG. 6A). For example, if the original OOS bitmap 114 is again 256K, a 512K buffer 126B is allocated. The OOS bitmap 114 is read into the buffer 126B, leaving 256K of empty buffer space. The OOS bitmap 114 is then expanded, byte-by-byte, into the empty buffer space. When half of the OOS bitmap 114 has been expanded and the empty buffer space occupied, half of the buffer space in which the original OOS bitmap 114 was located will have been freed and the expansion can continue until the entire OOS bitmap 114 has been expanded into the buffer 126B (FIG. 6B). In this embodiment, the size of the buffer 126 has been reduced by one-third.

Figure 7A:
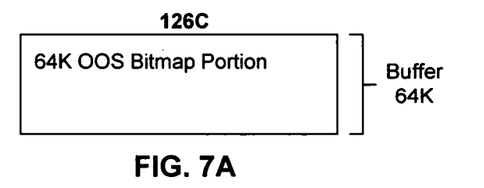
FIGS. 7A-7F represent a production site buffer of still another embodiment of the present invention in which portions of the OOS bitmap are sequentially expanded into a still smaller buffer space.
Figure 7B:
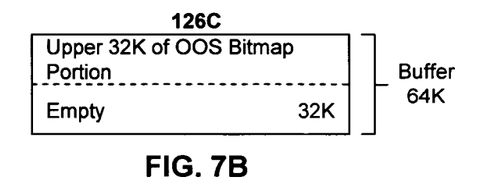
Figure 7C:
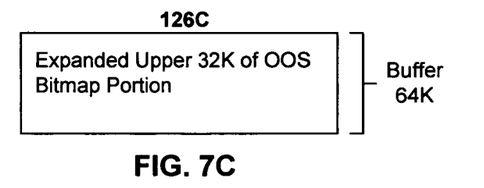
Figure 7D:
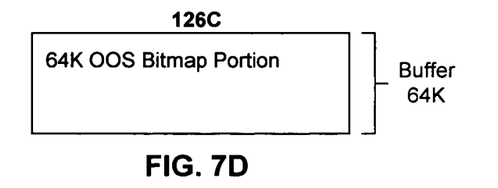
Figure 7E:
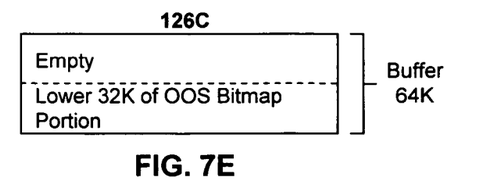
Figure 7F:
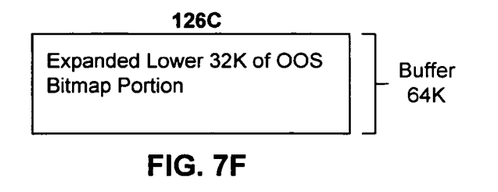
Figure 8:
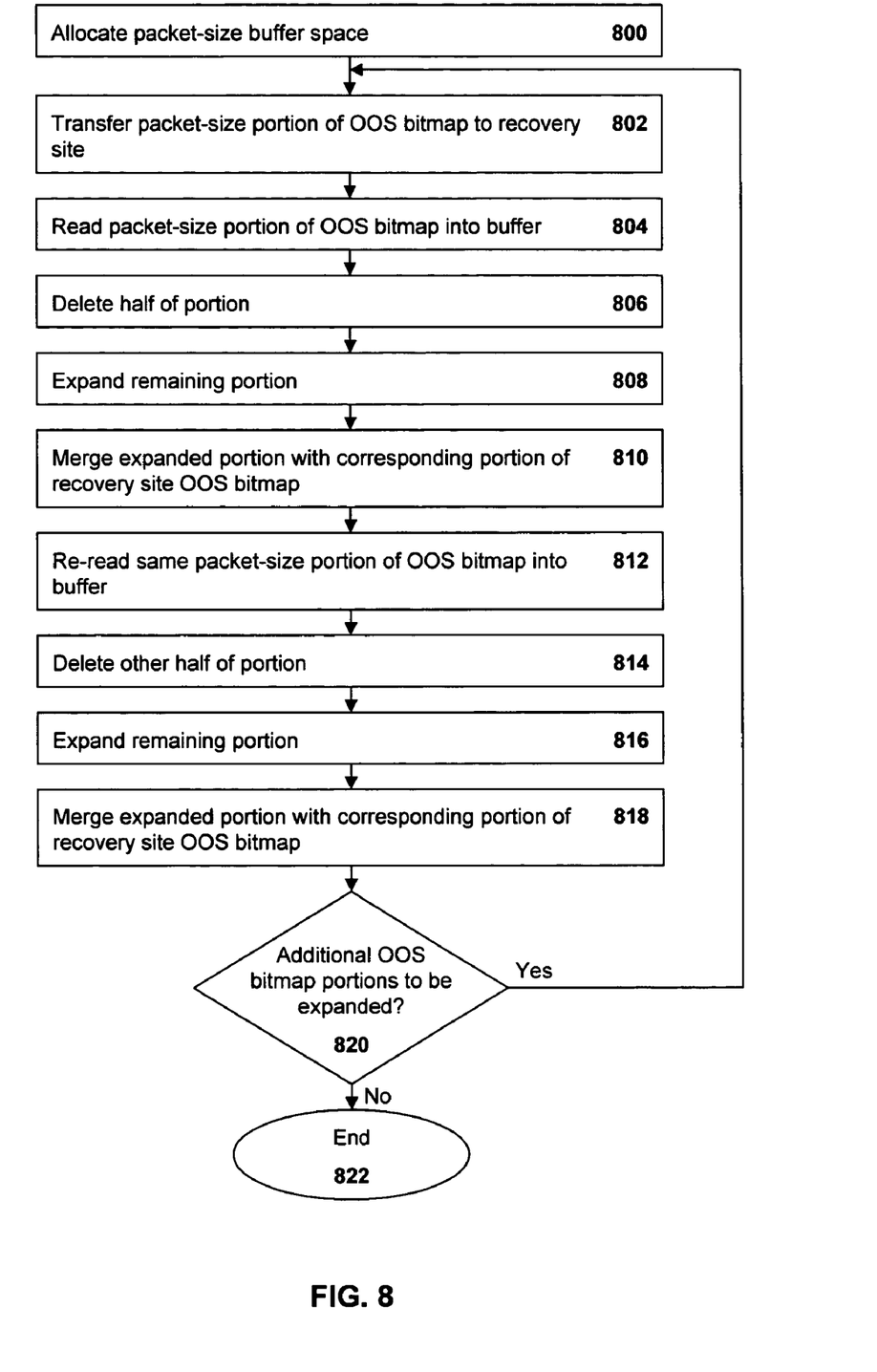
FIG. 8 is a flow chart of an OOS bitmap expansion method of the embodiment of the present invention illustrated in FIGS. 7A-7F.

Still more buffer space may be saved as provided in the embodiment of the present invention illustrated in FIGS. 7A-7F and the flowchart of FIG. 8. Because system architecture dictates that the OOS bitmap 114 be transferred from the production site 110 to the recovery site 120 in relatively small packets (such as 64K), portions of the production site OOS bitmap are transferred to the recovery site 120 (step 802) and read sequentially into a buffer 126C (step 804) which is allocated (step 800) enough space (64K in the example) to hold a single packet (FIG. 7A). Next, half of the bitmap portion (such as the lower half) is deleted from the buffer 126C (FIG. 7B; step 806)). The remaining half of the bitmap portion (the upper half) is then transferred and expanded into the buffer space (step 808) in the manner described with respect to the embodiment of FIGS. 6A and 6B (FIG. 7C) and to be merged with the corresponding portion of the recovery site OOS bitmap 124 (step 810). The same portion of the production site OOS bitmap 114 is again read into the buffer 126C (FIG. 7D; step 812) and the other half is deleted (FIG. 7E; step 814). The remaining half is transferred and expanded into the buffer space (FIG. 7F; step 816) to be merged with the corresponding portion of the recovery site OOS bitmap 124 (step 818). The process is repeated (step 820) with subsequent portions of the production site bitmap 114 until the entire production site bitmap 114 has been transferred to the recovery site 120, expanded, and merged into corresponding portions of the recovery site OOS bitmap 124 (step 822). In this embodiment, the size of the buffer 126 has been reduced to $\frac{1}{12}$ the size of the buffer employed in the embodiment of FIG. 5, a significant savings.

Table I represents an example of mapping employed to expand an OOS bitmap in accordance with the present invention from a production site with a track size of 64K to accommodate a recovery site with a track size of 32K. An array data structure is populated with 15 elements, each having two fields. One field is a 16-bit mask representing the tracks of a cylinder in the 64K system. The other field is a 32-bit mask representing the tracks of two corresponding cylinders in the 32K system.

TABLE I

```
typedef struct OneToTwoTrackSizeFactorMap {
    UINT16 sixtyFourKMask;
    UINT32 thirtyTwoKMask;
}OneToTwoTrackSizeFactorMap;
OneToTwoTrackSizeFactorMap
OneToTwoTrackSizeFactorMappingTable
        [CS_EST_PAIR_NUM_TRACKS_PER_CYLINDER] = {
    {(UINT16)0x8000, (UINT32)0xC0000000},
    {(UINT16)0x4000, (UINT32)0x30000000},
    {(UINT16)0x2000, (UINT32)0x0C000000},
    {(UINT16)0x1000, (UINT32)0x03000000},
    {(UINT16)0x0800, (UINT32)0x00C00000},
    {(UINT16)0x0400, (UINT32)0x00300000},
    {(UINT16)0x0200, (UINT32)0x000C0000},
    {(UINT16)0x0100, (UINT32)0x00028000},
    {(UINT16)0x0080, (UINT32)0x00006000},
    {(UINT16)0x0040, (UINT32)0x00001800},
    {(UINT16)0x0020, (UINT32)0x00000600},
    {(UINT16)0x0010, (UINT32)0x00000180},
    {(UINT16)0x0008, (UINT32)0x00000060},
    {(UINT16)0x0004, (UINT32)0x00000018},
    {(UINT16)0x0002, (UINT32)0x00000006}
};
```

Figure 9:
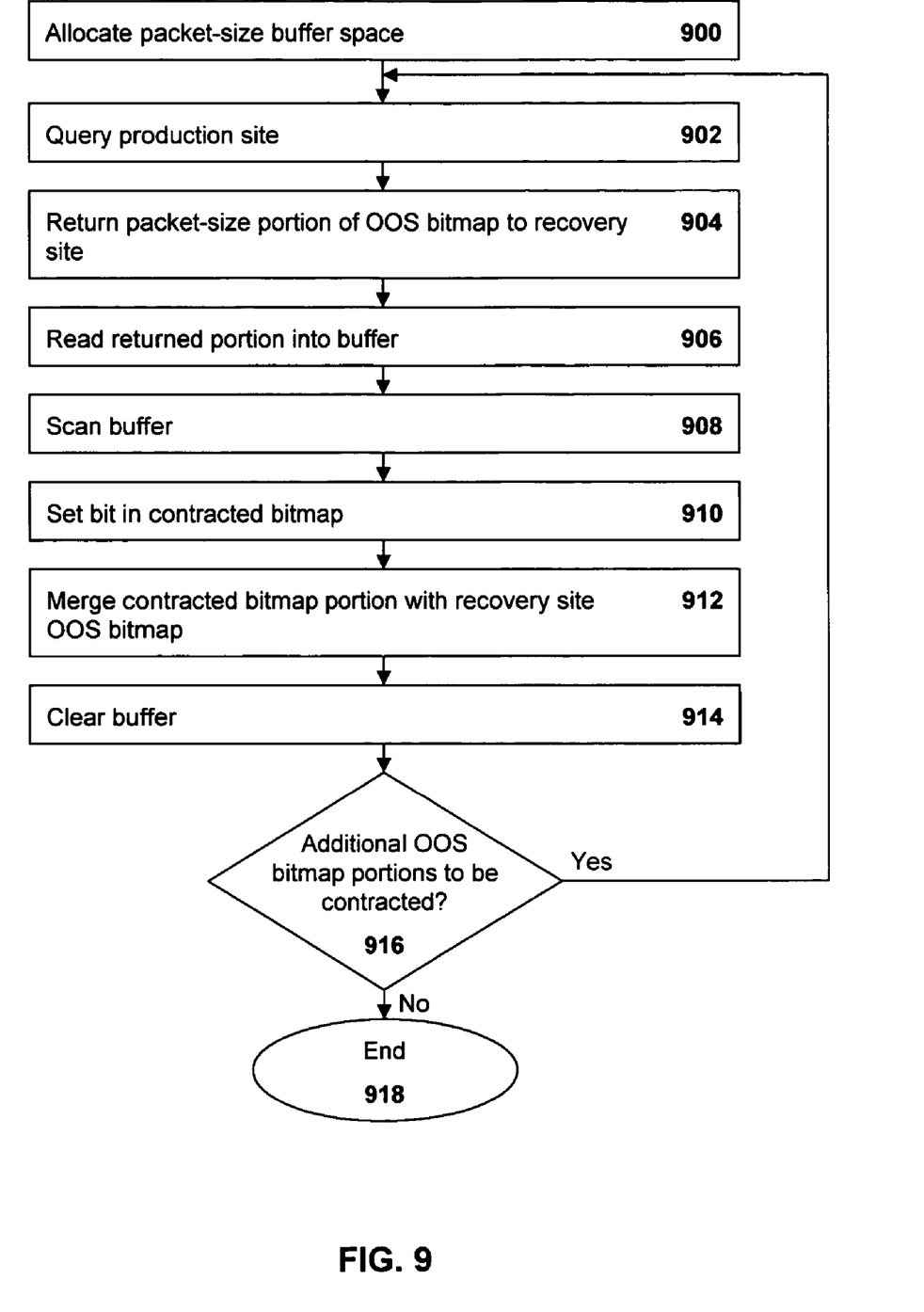
FIG. 9 is a flow chart of an OOS bitmap contraction method of the embodiment of the present invention illustrated in FIGS. 7A-7F.

If the size of tracks at the production site 110 is less than the size of tracks at the recovery site 120, the production site OOS bitmap 114 will be contracted before being merged with the recovery site OOS bitmap 124. For example, when the production site has 32K-track volumes and the recovery site has 64K-track volumes, the contraction operation may be performed as illustrated in the flowchart of FIG. 9. A 64 KB buffer is allocated at the recovery site (step 900). A query is then sent by the recovery site to the production site (step 902) which will return the first 64 KB of its OOS bitmap (step 904). That portion of the OOS bitmap is read into the previously allocated buffer (step 906), which is also used to perform the contraction. The buffer is then scanned (step 908) and, if any of two consecutive bits is set, the corresponding bit is set in the contracted bitmap being built (step 910). Upon completion of the scan operation, the first half of the 64 KB buffer will now contain the contracted bitmap which is then merged with the corresponding portion of the OOS bitmap at the recovery site (step 912). The buffer is then cleared (step 914). If there is more to read from the production site bitmap (916), the steps are repeated until the whole production site bitmap is read, contracted and merged with the recovery site bitmap (step 918).

Table II represents an example of mapping employed to contract an OOS bitmap in accordance with the present invention from a production site with a track size of 32K to accommodate a recovery site with a track size of 64K. A comparable data structure is used.

TABLE II

```
typedef struct TwoToOneTrackSizeFactorMap {
    UINT32 thirtyTwoKMask;
    UINT16 sixtyFourKMask;
}TwoToOneTrackSizeFactorMap;
TwoToOneTrackSizeFactorMap
TwoToOneTrackSizeFactorMappingTable
        [CS_EST_PAIR_NUM_TRACKS_PER_CYLINDER] = {
    {(UINT32)0xC0000000,(UINT16)0x8000},
    {(UINT32)0x30000000,(UINT16)0x4000},
    {(UINT32)0x0C000000,(UINT16)0x2000},
    {(UINT32)0x03000000,(UINT16)0x1000},
    {(UINT32)0x00C00000,(UINT16)0x0800},
    {(UINT32)0x00300000,(UINT16)0x0400},
    {(UINT32)0x000C0000,(UINT16)0x0200},
    {(UINT32)0x00028000,(UINT16)0x0100},
    {(UINT32)0x00006000,(UINT16)0x0080},
    {(UINT32)0x00001800,(UINT16)0x0040},
    {(UINT32)0x00000600,(UINT16)0x0020},
    {(UINT32)0x00000180,(UINT16)0x0010},
    {(UINT32)0x00000060,(UINT16)0x0008},
    {(UINT32)0x00000018,(UINT16)0x0004},
    {(UINT32)0x00000006,(UINT16)0x0002}
};
```

It is important to note that while the present invention has been described in the context of a fully functioning data processing system, those of ordinary skill in the art will appreciate that the processes of the present invention are capable of being distributed in the form of a computer readable storage medium of instructions and a variety of forms and that the present invention applies regardless of the particular type of signal bearing media actually used to carry out the distribution. Examples of computer readable storage media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for enhanced resynchronization in a storage-based mirroring system having different storage geometries or a method for deploying computing infrastructure comprising integrating computer readable code into a computing system for enhanced resynchronization in a storage-based mirroring system having different storage geometries.

What is claimed is:

1. A method for resynchronizing data during a recovery operation in a mirrored storage computing system in which the track size of data stored at a production site is different from the track size of data stored at an associated recovery site, the method comprising:

reading a first out-of-sync (OOS) bitmap from the production site, the first OOS bitmap identifying tracks stored at the production site which were written to during a failure at the production site;

storing the first OOS bitmap in a buffer having a predetermined size;

determining the track size of data stored at the production site relative to the track size of data stored at the recovery site;

converting the first OOS bitmap into a modified first OOS bitmap in which track identities correspond to track identities of tracks stored at the recovery site;

merging the modified first OOS bitmap into a second OOS bitmap identifying tracks stored at the recovery site which were written to during the failure at the production site, whereby a modified second OOS bitmap is generated identifying all tracks to be restored at the production site; and transferring from the recovery site to the production site those tracks identified by the modified second OOS bitmap;

wherein:

if the track size of data stored at the production site is twice as large as the track size of data stored at the recovery site and the predetermined size of the buffer is double a size of a first portion of the first OOS bitmap, the method further comprises:

a) reading the first OOS bitmap from the production site comprises reading the first portion of the first OOS bitmap;

b) storing the first portion of the first OOS bitmap comprises storing the first portion in the buffer;

c) converting the first OOS bitmap comprises expanding the first portion of the first OOS bitmap into the entire buffer to create a first modified OOS bitmap portion;

d) merging the first modified OOS bitmap comprises merging the first modified OOS bitmap portion into a corresponding portion of the second OOS bitmap; and e) the foregoing steps a) through d) are repeated for remaining unmodified portions of the first OOS bitmap;

if the track size of data stored at the production site is twice as large as the track size of data stored at the recovery site and the predetermined size of the buffer is equal to a size of a first portion of the first OOS bitmap, the method further comprises:
    f) reading the first OOS bitmap from the production site comprises reading a first portion of the first OOS bitmap;
    g) storing the first portion of the first OOS bitmap comprises storing the first portion in the buffer;
    h) converting the first OOS bitmap comprises:
        discarding a first half of the first portion of the first OOS bitmap, whereby a first half of the buffer is empty; and
        expanding the remaining half of the first portion of the first OOS bitmap into the entire buffer to create a modified first half OOS bitmap portion;
    i) merging the first modified OOS bitmap comprises merging the modified first half OOS bitmap portion into a corresponding portion of the second OOS bitmap;
    j) the foregoing steps f) through i) are repeated for a second half of the first portion of the first OOS bitmap; and
    k) the foregoing steps f) through j) are repeated for remaining unmodified portions of the first OOS bitmap; and
if the track size of data stored at the production site is half as large as the track size of data stored at the recovery site, the method further comprises:
    l) reading the first OOS bitmap from the production site comprises reading a first portion of the first OOS bitmap, the first portion having a predetermined size;
    m) storing the first portion of the first OOS bitmap comprises storing the first portion in a buffer having the predetermined size;
    n) converting the first OOS bitmap comprises:
        scanning the first portion of the first OOS bitmap to identify any two consecutive set bits; and
        setting a corresponding bit in a first modified OOS bitmap portion;
    o) merging the first modified OOS bitmap comprises merging the first modified OOS bitmap portion into a corresponding portion of the second OOS bitmap; and
    p) the foregoing steps l) through o) are repeated for remaining unmodified portions of the first OOS bitmap.

2. The method of claim 1, wherein:
the track size of data stored at the production site is 64 KB;
the predetermined size of the first portion of the first OOS bitmap is 64 KB;
the track size of data stored at the recovery site is 32 KB; and
the predetermined size of the buffer is 64 KB.

3. The method of claim 1, wherein:
the track size of data stored at the production site is 32 KB;
the predetermined size of the first portion of the first OOS bitmap is 64 KB;
the track size of data stored at the recovery site is 64 KB; and
the predetermined size of the buffer is 64 KB.

4. The method of claim 1, wherein merging comprises performing a logical OR operation.

5. A mirrored storage computing system, comprising:
a production site for storing data from a host device, the data stored at the production site having a first track size;
a recovery site, coupled to the production site, for storing a copy of the data from the host device, the data stored at the recovery site having a second track size;
a first out-of-sync (OOS) bitmap associated with the production site identifying tracks stored at the production site which were written to during a failure at the one of the production site and the recovery site;
a second out-of-sync (OOS) bitmap associated with the recovery site identifying tracks stored at the recovery site which were written to during the failure;
a resynchronization controller;
a buffer associated with the controller and having a predetermined size;
a processor associated with the controller and operative to;
    read the first OOS bitmap into the buffer;
    determine the first track size relative to the second track size;
    convert the first OOS bitmap into a modified first OOS bitmap in which track identities correspond to track identities of tracks stored at the second site;
    merge the modified first OOS bitmap into the second OOS bitmap, whereby a modified second OOS bitmap is generated identifying all tracks which were written to the production and recovery sites during the failure and which are to be restored during a subsequent recovery; and
    direct the transfer to the site at which the failure occurred from the other site of those tracks identified by the modified second OOS bitmap;
wherein:
    if the track size of data stored at the production site is twice as large as the track size of data stored at the recovery site and the predetermined size of the buffer is double a size of a first portion of the first OOS bitmap, the processor is further operative to:
        a) read the first OOS bitmap from the production site comprises reading the first portion of the first OOS bitmap;
        b) store the first portion of the first OOS bitmap comprises storing the first portion in the buffer;
        c) convert the first OOS bitmap comprises expanding the first portion of the first OOS bitmap into the entire buffer to create a first modified OOS bitmap portion;
        d) merge the first modified OOS bitmap comprises merging the first modified OOS bitmap portion into a corresponding portion of the second OOS bitmap; and
        e) repeat the foregoing steps a) through d) for remaining unmodified portions of the first OOS bitmap;
    if the track size of data stored at the production site is twice as large as the track size of data stored at the recovery site and the predetermined size of the buffer is equal to a size of a first portion of the first OOS bitmap, the processor is further operative to:
        f) read the first OOS bitmap from the production site comprises reading a first portion of the first OOS bitmap;
        g) store the first portion of the first OOS bitmap comprises storing the first portion in the buffer;
        h) convert the first OOS bitmap by:
            discarding a first half of the first portion of the first OOS bitmap. whereby a first half of the buffer is empty; and
            expanding the remaining half of the first portion of the first OOS bitmap into the entire buffer to create a modified first half OOS bitmap portion;

i) merge the first modified OOS bitmap comprises merging the modified first half OOS bitmap portion into a corresponding portion of the second OOS bitmap;
j) repeat the foregoing steps f) through i) for a second half of the first portion of the first OOS bitmap; and
k) repeat the foregoing steps f) through j) for remaining unmodified portions of the first OOS bitmap; and if the track size of data stored at the production site is half as large as the track size of data stored at the recovery site, the processor is further operative to:
l) read the first OOS bitmap from the production site comprises reading a first portion of the first OOS bitmap, the first portion having a predetermined size;
m) store the first portion of the first OOS bitmap comprises storing the first portion in a buffer having the predetermined size;
n) convert the first OOS bitmap by:
scanning the first portion of the first OOS bitmap to identify any two consecutive set bits; and
setting a corresponding bit in a first modified OOS bitmap portion;
o) merge the first modified OOS bitmap comprises merging the first modified OOS bitmap portion into a corresponding portion of the second OOS bitmap; and
p) repeat the foregoing steps l) through o) for remaining unmodified portions of the first OOS bitmap.

6. The system of claim 5, wherein the resynchronization controller is associated with the recovery site.

7. The system of claim 5, wherein the resynchronization controller is associated with the production site.

8. The system of claim 5, wherein:
the track size of data stored at the production site is 64 KB;
the predetermined size of the first portion of the first OOS bitmap is 64 KB;
the track size of data stored at the recovery site is 32 KB; and
the predetermined size of the buffer is 64 KB.

9. The system of claim 5, wherein:
the track size of data stored at the production site is 32 KB;
the predetermined size of the first portion of the first OOS bitmap is 64 KB;
the track size of data stored at the recovery site is 64 KB; and
the predetermined size of the buffer is 64 KB.

10. A computer program product of a computer recordable storage medium usable with a programmable computer, the computer program product having computer-readable code stored therein for resynchronizing data during a recovery operation in a mirrored storage computing system in which the track size of data stored at a production site is different from the track size of data stored at an associated recovery site, the computer-readable code comprising instructions for:
reading a first out-of-sync (OOS) bitmap from the production site, the first OOS bitmap identifying tracks stored at the production site which were written to during a failure at the production site;
storing the first OOS bitmap in a buffer having a predetermined size;
determining the track size of data stored at the production site relative to the track size of data stored at the recovery site;
converting the first OOS bitmap into a modified first OOS bitmap in which track identities correspond to track identities of tracks stored at the recovery site;
merging the modified first OOS bitmap into a second OOS bitmap identifying tracks stored at the recovery site which were written to during the failure at the production site, whereby a modified second OOS bitmap is generated identifying all tracks to be restored at the production site; and
transferring from the recovery site to the production site those tracks identified by the modified second OOS bitmap;
wherein:
if the track size of data stored at the production site is twice as large as the track size of data stored at the recovery site and the predetermined size of the buffer is double a size of a first portion of the first OOS bitmap, the instructions further comprise instructions for:
a) reading the first OOS bitmap from the production site comprises reading the first portion of the first OOS bitmap;
b) storing the first portion of the first OOS bitmap comprises storing the first portion in the buffer;
c) converting the first OOS bitmap comprises expanding the first portion of the first OOS bitmap into the entire buffer to create a first modified OOS bitmap portion;
d) merging the first modified OOS bitmap comprises merging the first modified OOS bitmap portion into a corresponding portion of the second OOS bitmap; and
e) the foregoing steps a) through d) are repeated for remaining unmodified portions of the first OOS bitmap;

if the track size of data stored at the production site is twice as large as the track size of data stored at the recovery site and the predetermined size of the buffer is equal to a size of a first portion of the first OOS bitmap, the instructions further comprise instructions for:
f) reading the first OOS bitmap from the production site comprises reading a first portion of the first OOS bitmap;
g) storing the first portion of the first OOS bitmap comprises storing the first portion in the buffer;
h) converting the first OOS bitmap comprises:
discarding a first half of the first portion of the first OOS bitmap, whereby a first half of the buffer is empty; and
expanding the remaining half of the first portion of the first OOS bitmap into the entire buffer to create a modified first half OOS bitmap portion;
i) merging the first modified OOS bitmap comprises merging the modified first half OOS bitmap portion into a corresponding portion of the second OOS bitmap;
j) the foregoing steps f) through i) are repeated for a second half of the first portion of the first OOS bitmap; and
k) the foregoing steps f) through j) are repeated for remaining unmodified portions of the first OOS bitmap; and if the track size of data stored at the production site is half as large as the track size of data stored at the recovery site, the instructions further comprise instructions for:

l) reading the first OOS bitmap from the production site comprises reading a first portion of the first OOS bitmap, the first portion having a predetermined size;

m) storing the first portion of the first OOS bitmap comprises storing the first portion in a buffer having the predetermined size:

n) converting the first OOS bitmap comprises:
scanning the first portion of the first OOS bitmap to identify any two consecutive set bits; and
setting a corresponding bit in a first modified OOS bitmap portion;

o) merging the first modified OOS bitmap comprises merging the first modified OCS bitmap portion into a corresponding portion of the second OOS bitmap; and p) the foregoing steps l) through o) are repeated for remaining unmodified portions of the first OOS bitmap.

11. The computer program product of claim 10, wherein:
the track size of data stored at the production site is 64 KB;
the predetermined size of the first portion of the first OOS bitmap is 64 KB;
the track size of data stored at the recovery site is 32 KB; and
the predetermined size of the buffer is 64 KB.

12. The computer program product of claim 10, wherein:
the track size of data stored at the production site is 32 KB;
the predetermined size of the first portion of the first OOS bitmap is 64 KB;
the track size of data stored at the recovery site is 64 KB; and
the predetermined size of the buffer is 64 KB.

* * * * *